United States Patent [19]

Kaplan

[11] Patent Number: 5,274,228
[45] Date of Patent: Dec. 28, 1993

[54] LINEAR LIGHT SOURCE/COLLECTOR WITH INTEGRATING CYLINDER AND LIGHT PIPE MEANS

[75] Inventor: Martin C. Kaplan, Rochester, N.Y.

[73] Assignee: Eastman Kodak Company, Rochester, N.Y.

[21] Appl. No.: 891,009

[22] Filed: Jun. 1, 1992

[51] Int. Cl.⁵ .............................................. H01J 5/16
[52] U.S. Cl. ................................ 250/227.31; 250/228
[58] Field of Search ..................... 250/227.11, 227.31, 250/227.32, 228; 356/236

[56] References Cited

U.S. PATENT DOCUMENTS

| | | | |
|---|---|---|---|
| 3,101,411 | 8/1963 | Richards | 250/83.3 |
| 4,128,332 | 12/1978 | Rowe | 355/67 |
| 4,181,398 | 1/1980 | Sick | 250/227.31 |
| 4,186,431 | 1/1980 | Engel et al. | 362/223 |
| 4,314,283 | 2/1982 | Kramer | 358/294 |
| 4,321,630 | 3/1982 | Kramer | 358/294 |
| 4,371,897 | 2/1983 | Kramer | 358/294 |
| 4,568,984 | 2/1986 | Juergensen et al. | 250/228 |
| 4,710,624 | 12/1987 | Alvarez et al. | 250/228 |
| 4,733,332 | 3/1988 | Yamashita et al. | 362/32 |
| 4,797,711 | 1/1989 | Sasada et al. | 355/32 |
| 4,868,383 | 9/1989 | Kurtz et al. | 250/228 |
| 4,899,040 | 2/1990 | Davis et al. | 250/216 |
| 4,954,931 | 9/1990 | Hassler, Jr. | 362/32 |
| 5,012,346 | 4/1991 | DeJager et al. | 358/214 |

FOREIGN PATENT DOCUMENTS 62275247 5/1989 Japan .
62302547 6/1989 Japan .

OTHER PUBLICATIONS

Milch, james R., "Line Illumination System and Detector for Film Digitization," SPIE, vol. 1242, Charge-Coupled Devices and Solid State Optical Sensors (1990), pp. 66-77.
Kurtz, Andrew F. and Kessler, David, "Optical Scanning System for a CCD Telecine for HDTV," SPIE, vol. 1448, Camera and Input Scanner Systems (1991), pp. 191-205.
Kaplan, Martin C., "Monte Carlo Calculation of Light Distribution of an Integrating Cavity Illuminator," SPIE, vol. 1448, Camera and Input Scanner Systems (1991), pp. 206-217.

Primary Examiner—David C. Nelms
Attorney, Agent, or Firm—David M. Woods

[57] ABSTRACT

An improved linear light source or light collector for a film scanner comprising an elongated, cylindrical light integrating cylinder enclosed by first and second end walls and a longitudinal, cylindrical side wall, all having a diffusely-reflecting interior surface, the longitudinal side wall having a longitudinally extending outlet/inlet slit therein and an elongated light pipe, e.g. a glass rod, having a port at one end thereof for emitting light entering its input port (when used as a source) or for collecting light entering the slit (when used as a collector) in a preferred intensity profile varying along its length. The glass rod is mounted inside and parallel to the side wall of the cavity to direct light emitted laterally therefrom toward or to collect light reflected from the diffusely-reflecting interior surfaces. When used as a light source, a lens system directs the light from the light source into the end port of the glass rod. When used as a light collector, the light emitted from the end port is detected by a photodetector. The proferred intensity profile may be effected by a surface treatment of the glass rod comprises a coating of reflective paint applied in a lengthwise varying pattern that allows for tailoring the light reflected out of or into the glass rod along its length. A specular reflective mirror or a spaced-apart diffuse mirror may be positioned at the other end of the glass rod. In a further embodiment, the elongated glass rod is tapered from a first diameter at the outlet/inlet port to a point at the other end thereof in a taper that is tailored to control the intensity profile of light emitted or collected by the glass rod along its length. The end port is also preferably tapered to concentrate light and reduce the overall size of the linear light source/collector.

36 Claims, 3 Drawing Sheets

LINEAR LIGHT SOURCE/COLLECTOR WITH INTEGRATING CYLINDER AND LIGHT PIPE MEANS

BACKGROUND OF THE INVENTION

1. Field of the Invention

The present invention relates to a linear light source/collector, and more particularly, to such a light source/collector for use in film scanners.

2. Description of the Prior Art

In film digitizers linear light sources and collectors have been frequently employed. A telecine film scanner typically includes a linear CCD image sensor which provides a serial output of signals representing successive lines of an image illuminated by a linear light source. For color applications, the film scanner can include an assembly of three separate CCD image sensors, one for each of the primary colors. The film is driven at a uniform rate past a linear light source, and an illuminated line of the film is imaged onto each CCD image sensor. The film motion provides the frame scan, and the linear cycling of the elements in the image sensor provides the line scan. A scanner of this type is disclosed in U.S. Pat. No. 4,205,337.

It is common for telecine film scanners to have an illumination system which produces a line of light across the film. The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g., scratches, will appear in an image produced from the scanned information.

An improved type of illumination system is disclosed in U.S. Pat. No. 4,868,383, which is assigned to the assignee of the present invention. This patent discloses a linear light source for a film scanner which includes means for generating an intense beam of light and an elongated cylindrical integrating cavity having diffusely reflective walls. The intense beam is introduced into the cavity through an input port, and a uniform line of light is emitted through an output slit which extends parallel to the longitudinal axis of the cylindrical integrating cavity. Such a light source produces a line of diffuse light which has a uniform linear and angular distribution, and excellent results can be obtained over a wide range of operating conditions. There is a need, however, in certain types of scanners for a linear light source in which the linear distribution issuing from such a light source can be very closely controlled in order to control the intensity of the light on a receiving medium.

Other considerations taken into account in the design of telecine scanners and linear light sources are set forth in the articles: J. R. Milch, "Line Illumination System and Detector for Film Digitization," *SPIE Proc.*, Vol. 1242, pp. 66-77, February 1990; M. Kaplan, "Monte Carlo Calculation of Light Distribution in an Integrating Cavity Illuminator," *SPIE Proc.*, Vol. 1448, pp. 206-217, February 1991; and A. F. Kurtz and David Kessler, "Optical Scanning System for a CCD Telecine for HDTV," *SPIE Proc.*, Vol. 1448, pp. 191-205, February 1991.

It has also been proposed to provide an integrating cylinder with the entry hole in an end face, rather than on the side of the cylinder. The primary advantage of an end hole is that it mechanically fits better into some scanner systems. A great disadvantage is that the source lamp must be carefully aligned with respect to the cavity. Also, the uniformity of light diffusion in the cavity with the end face entry hole is usually worse than the side entry hole.

Figure 4:
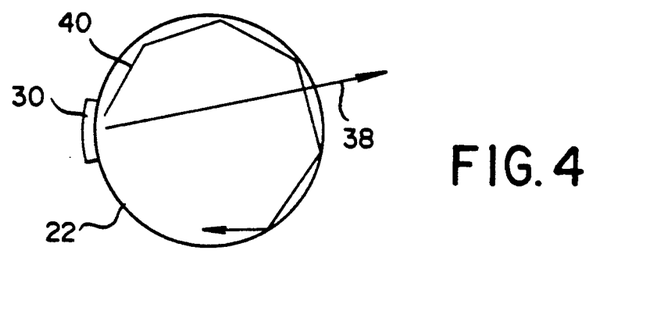
FIG. 4 is a schematic illustration of an end view of the glass rod showing how light rays are trapped within it or reflected out by a surface treatment stripe.

These light integrating cylinders are also used in the inverse fashion to collect light entering the elongated slit in the cylinder wall and present it to a photodetector positioned at an exit port as depicted in FIG. 4 of the above referenced Kaplan article. In this context the slit of the integrating cylinder is oriented to receive light transmitted through (or reflected by) an image leaving medium, e.g. radiographic film, that is scanned lineally by a laser beam. In such scanners the images, recorded in the form of variations in the film density or opacity, are scanned repeatedly with the laser light beam and the transmitted (or reflected) intensity of the beam is continuously read out by the photodetector. The integrating cylinder thus acts to collect the light of the beam entering the slit and direct it to the photodetector. In this context it is important that the integrating cylinder light collector does not, through its design, accentuate or attenuate the image modulated intensity of the light depending on the angle that it enters the slit.

In the design of such linear light sources and collectors, it has been proposed to employ a light pipe or glass rod positioned with the integrating cylinder and extending parallel to the exit slit in the cylinder wall to distribute light from a light source to the cylinder or to collect light from the cylinder and direct it to the photodetector. Japanese Laid Open Patent Publication Nos. 1-116630 (Application No. 62-275247) and 1-143937 (Application No. 62-143937) disclose such an arrangement where the light pipe has a stripe of barium sulfate to a given width and in the lengthwise direction to form a light scattering band. Light entering one end of the light pipe is scattered, by striking the stripe at a critical angle, into the cylinder and scattered until it exits the elongated stripe. Conversely, light may be collected that enters the slit and directed out the end of the light pipe.

Despite these improvements made in integrating cylinder linear light sources and collectors, difficulties remain in achieving efficiency and uniformity in light intensity emitted or detected along the length of the slit.

SUMMARY OF THE INVENTION

It is thus an object of the present invention to overcome the problems in the prior art discussed above and to provide an improved linear light source/collector for a film scanner.

In accordance with one aspect of the present invention, there is provided a linear light integrating cylinder comprising: an elongated light integrating cavity enclosed by first and second walls and a longitudinal side wall having a diffusely-reflecting interior surface, said longitudinal side wall having a longitudinally extending light outlet or inlet slit therein; elongated light pipe means having a port at one end thereof and a surface treatment or configuration which varies along its length for emitting light entering the port in a preferred intensity profile along its length or collecting light entering the slit and directing it to the port; and means for mounting the elongated light pipe means in relation to the side wall of the cavity to direct light emitted laterally therefrom toward or to collect light reflected from the diffusely-reflecting interior surfaces.

In the linear light source embodiment, various surface treatments or configurations of the light pipe means are contemplated for achieving uniformity of light emission from the outlet slit from a source of light directed into the port including providing a pattern of reflective paint applied lengthwise and varying in width or in a discontinuous pattern, varying the diameter of the light pipe means along the length, selectively adding scattering impurities or voids to the light pipe material along the length, applying a specularly reflective means to the free end of the light pipe means opposite to the port, mounting a diffusely reflective means (e.g., a white painted surface) spaced a slight distance from the free end of the light pipe means, and tapering the free end. These techniques may be used alternatively or co-operatively to tailor the light emitted along the length of the light pipe means in relation to the geometry of the integrating cavity to provide uniform light emission at the slit and to efficiently distribute light from the source with minimal backscatter out the port.

These same techniques may be employed in tailoring the light pipe means to efficiently collect light entering the slit anywhere along its length without distorting the intensity of the light passed through or reflected by the scanned media.

The light pipe means is preferably mounted off-center to the axis of the integrating cavity and adjacent to its wall near the elongated slit so that light exiting the light pipe means is reflected by the cavity wall before it is emitted through the slit. The same positioning is desirable in the light collector context so that light entering the slit is reflected at least once before it strikes the light pipe means.

The light pipe means may be mounted in the wall of the cavity to allow reduction in the overall size of the linear light source/collector. The light pipe means is preferably constructed of circular, polished glass or plastic rod having a roughened or white painted stripe extending lengthwise along a portion of the circumference and varying in width or in a discontinuous pattern to tailor light emission/collection characteristics along its length. Preferably the stripe is oriented away from the linear slit of the cavity when the rod is mounted with respect to the cavity. In preferred embodiments the cavity is a cylinder of circular cross section having its interior surface wall painted with a light diffusing white paint.

In a further embodiment, the elongated rod does not have a painted stripe but is tapered from a first diameter at the inlet port to a point at the other end thereof and wherein the diameter is reduced from the first diameter to the point in order to control the intensity profile of light emitted or collected by the glass rod along its length.

BRIEF DESCRIPTION OF THE DRAWINGS

Other features and advantages will become apparent upon reference to the following description of the preferred embodiments when read in light of the attached drawings, wherein like elements are referenced by like numerals, and wherein.

The drawings are not necessarily to scale.

DESCRIPTION OF THE PREFERRED EMBODIMENTS

Figures 1, 2:
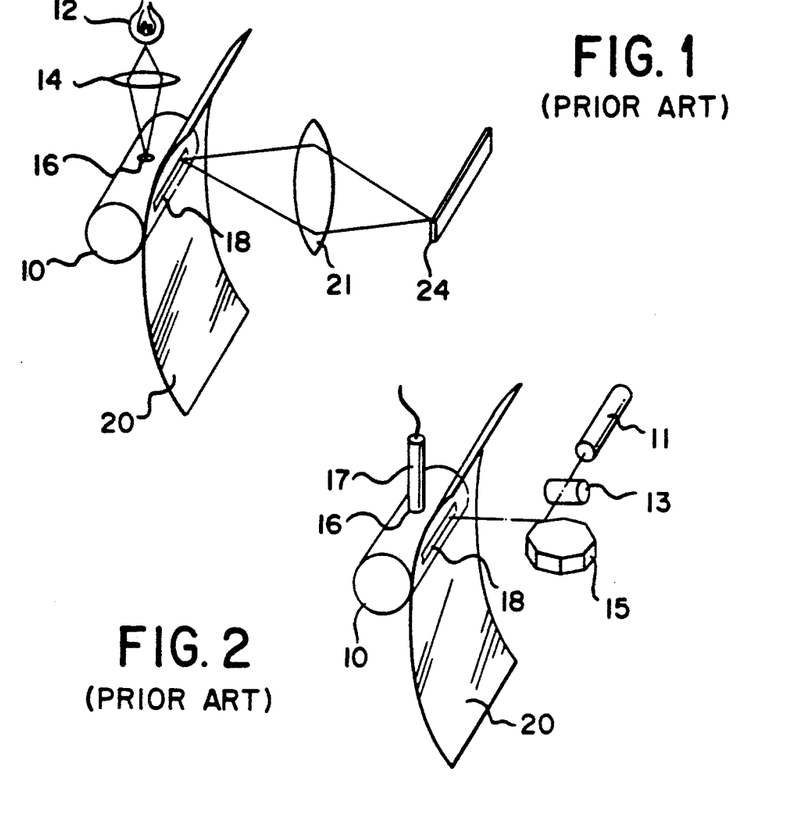
FIG. 1 is a perspective view of a prior art film scanner and linear light source.
FIG. 2 is a perspective view of a prior art film scanner and a linear light collector.

Referring now to FIG. 1, integrating cylinders 10, currently used as linear light sources in many film scanners, diffuse light introduced from a lamp 12 and lens 14 into a hole 16 in the cylinder wall. The light reflects many times against the white interior cylinder walls to randomize its distribution. This randomization is intended to produce uniform, diffuse light within the cylinder 10, which then exits through a long, narrow exit slit 18 to produce a stripe of uniform, diffuse illumination applied against one surface of the film 20.

The light passing through the film 20 is modulated in intensity by the density varying image and focused by a lens system 21 on a sensor array 24. The sensor array 24 is typically a CCD array that provides data to a further system for digitizing the image pixel values and for displaying the images on the film. By moving the film 20 vertically a full image frame on the film 20 can be scanned.

FIG. 2 illustrates the use of an integrating cavity 10 as a linear light collector used to collect a laser light beam passing through and modulated by the density of image on the film 20. Such film scanners are typically used to scan radiographic images recorded by X-ray or the like on transparencies in order to provide a digital record for storage, transmission to remote locations and to conduct image enhancement and analysis.

In FIG. 2 the laser light source 11 is imaged by a lens system 13 onto the facets of a rotating mirror 15 which deflects the beam in a scanning line onto the film 20. The scanned beam transverses the film 20, and light transmitted through the film 20 enters the slit 18 of the integrating cylinder 10. The cylinder 10, constructed as described above, reflects the light internally until it is picked up by a photodetector 17 positioned at port 16. Thus the light integrating cylinder or cavity used as a light collector functions inversely to its use as a linear light source.

In order to simplify the remaining description of the preferred embodiments, it will be directed to the use of the inventive light integrating cavity features and construction in the context of a linear light source of FIG. 1, although it will be understood that the description applies as well to its use as a linear light collector of FIG. 2, except as noted.

Integrating cylinders of the type shown in FIG. 1 are inefficient, typically wasting 70-90% of the light entering the port 16. The ideal output profile has somewhat more light at the ends than at the center of the slit 18, but the current cylinders 10 tend toward the converse, and customizing the profile is difficult. The stripe of illumination also often has substantial light at undesirable angles, sometimes strongly peaked. The source lamp 12 and lens 14 need to be carefully aligned with respect to the entry hole 16 to produce near optimum results.

Figure 3:
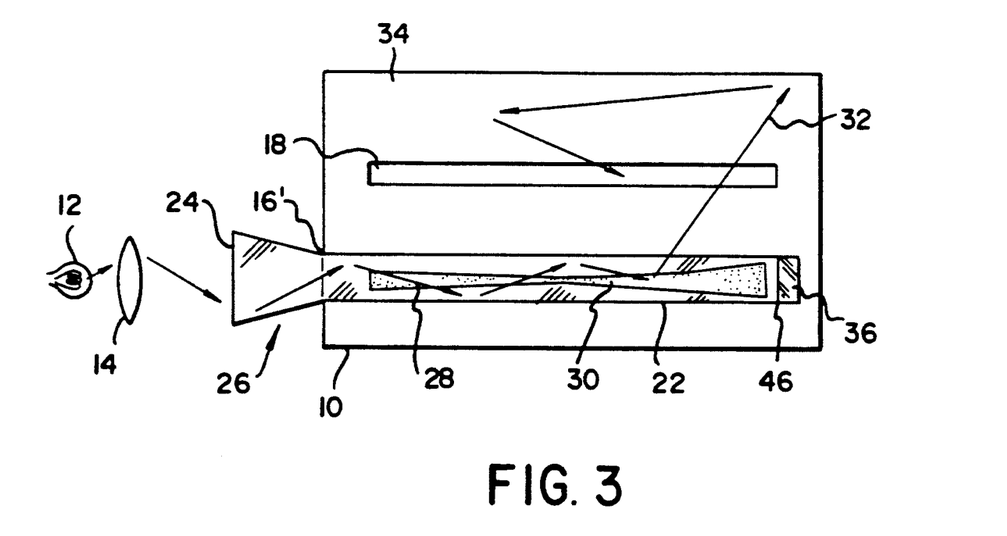
FIG. 3 is a schematic elevation view of a first embodiment of the linear light source of the present invention illustrating the arrangement of the source lamp, glass rod light pipe and integrating cylinder outlet slit.

In accordance with the present invention, a long, cylindrical light pipe, e.g. a glass rod 22, is inserted through the end hole as shown in the embodiment of FIG. 3. The rod 22 runs along the length of the cylinder 10. The source lamp 12 shines onto the exterior end face 24 of the port 26 of the glass rod 22 (rather than simply onto the cylinder entry hole). For a glass with a sufficiently high index of refraction, the glass rod 22 traps the light by total internal reflection (TIR), so that the light propagates down the length of the rod 22 as shown by the arrow 28. The exterior surface of the rod 22 is painted with a white strip 30 along its length, which scatters some of the light as shown by the arrow 32 so that it is no longer confined by TIR and leaks out from the rod and into the integrating cylinder cavity 34. As the light propagates down the rod 22, some of it encounters the white paint stripe 30, where it is scattered (diffusely) in a random direction shown by arrow 32. Some of this scattered light will continue to propagate down the rod (or perhaps back toward the port 26) by TIR, but some of the scattered light will be traveling in directions that violate the conditions for TIR, and it will escape from the rod 22 into the cavity 34.

The white strip 30 can be customized (e.g., by varying its width) to cause more light leakage at the ends than in the middle of the cylinder 10, thus permitting control over the distribution of light within the cavity 34, and in turn controlling the profile of output light at the exit slit 18. It can also be customized for other profiles that may be desirable, including a uniform profile.

Because the profile can be controlled, it is not necessary to depend on randomization within the cylindrical cavity 34 to produce uniform output. Thus, the cylinder 10 can have a smaller diameter, which will reduce the interior surface area of the cylinder 10 and thereby increase the efficiency of the system. Indeed, it is necessary to reduce the diameter of the cylinder 10, for otherwise it will tend to randomly mix the output light (which previously was desirable) and thereby negate the ability to customize the profile.

By choosing an integrating cylinder 10 of moderate diameter, the cavity 34 can randomize the light over a moderate distance. This will randomize the emitted light angles, so that the light output is approximately Lambertian. It will also smooth any small scale irregularities. By avoiding making the cylinder diameter too large, it is possible to preserve some of the variation of optical power as a function of position along the length of the cavity 34, thus producing a non-uniform, customized profile for light output (brightness) versus position along the exit slit 18.

Referring to FIG. 4, it depicts, through an end view of the glass rod 22, the manner in which light travels down the length of the glass rod 22 and is reflected back from its other end. The other end may have a reflective mirror 36 (as shown in FIG. 3) that reflects the light back toward the port 26. As the light travels down the length of the rod a portion strikes the painted stripe 30 and is reflected at an angle sufficiently great to be transmitted through the wall of the glass rod 22 in the direction of arrow 38. Other light is reflected at too shallow an angle (as shown by arrow 40) and is retained within the glass rod 22.

Light leaking from the glass rod 22 will preferentially exit the rod on the side opposite the white stripe 30. This is partly because the white stripe 30 will reflect the light in a Lambertian pattern, which is preferential toward the opposite side. However, there is also a substantial TIR effect. This effect, shown in FIG. 4, results from the fact that light traveling diametrically in the direction of arrow 38 across the rod 22 from the white stripe 30 most strongly violates the TIR conditions (i.e., is closest to normal incidence). This effect can be used when designing the integrating cavity/glass rod package.

It is contemplated that the glass rod may be clad with a glass of a different index of refraction in order to protect the surface of the glass rod light pipe means from contamination which would alter its light scattering and collecting characteristics. In this regard the cladding may cover the rod in all areas except where the reflective surface treatment is present or may be supplied over the reflective surface treatment.

Because the cylinder cavity 34 is now being illuminated from the elongated, narrow, glass rod 22, there is greater positional control over entry of light into the cavity 34 by adjusting the position of the rod 22 with respect to the axis of the cylinder 10 and the angular displacement from the exit slit 18. This permits better control over the spurious angular peaks present in the light output of many integrating cylinders. This control over the entry position of light into the cavity also largely decouples the cavity illumination from the alignment.

Figure 5:
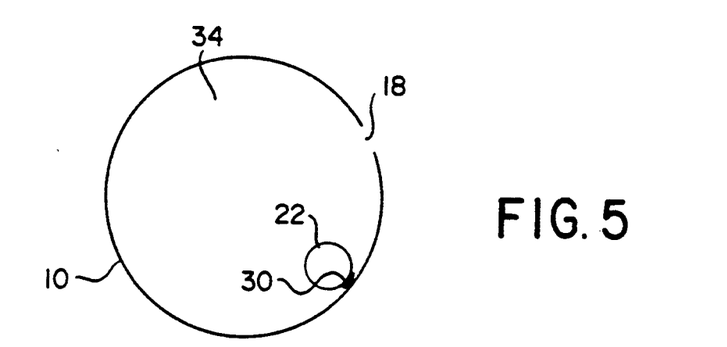
FIGS. 5 and 6 illustrate first and second positions of the glass rod light pipe with respect to the integrating cylinder and its output slit.
Figure 6:
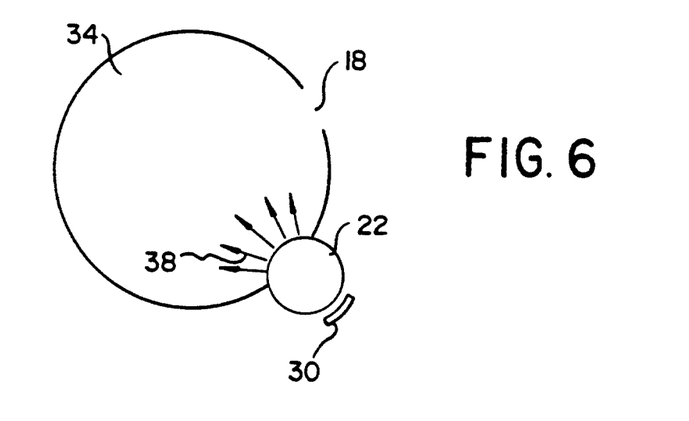

By suitably orienting the glass rod 22 and white stripe 30, as shown in FIG. 5, the light leaking from the rod 22 can be directed away from the cavity exit slit 18, thus reducing the undesirable peaks in the angular profile of light emitted from the integrating cavity exit slit 18. Also, because of the assymmetry in optical systems, since the rod 22 tends to emit light only on the side opposite the white stripe 30, it will also tend to capture light (from the cavity 34) only on the side opposite the white stripe 30. This reduces the capture cross-section for light propagating from the cavity 34 into the rod 22 and back out the entry port 26. It may even be desirable to bury the rod in the wall of the cavity, as shown in FIG. 6, to further reduce the capture cross-section (and concomitant absorption) of the glass rod 22 and to reduce the overall cylinder size.

Figure 7:
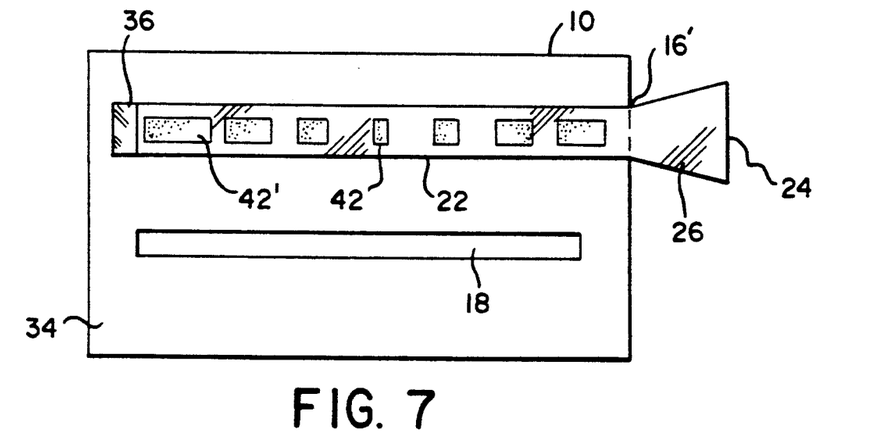
FIGS. 7, 8 and 9 illustrate further embodiments of the linear light source of FIG. 3.
Figure 8:
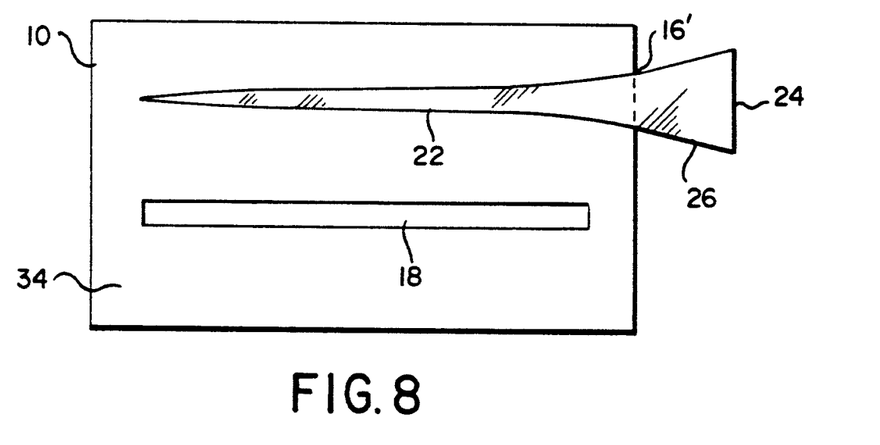
Figure 9:
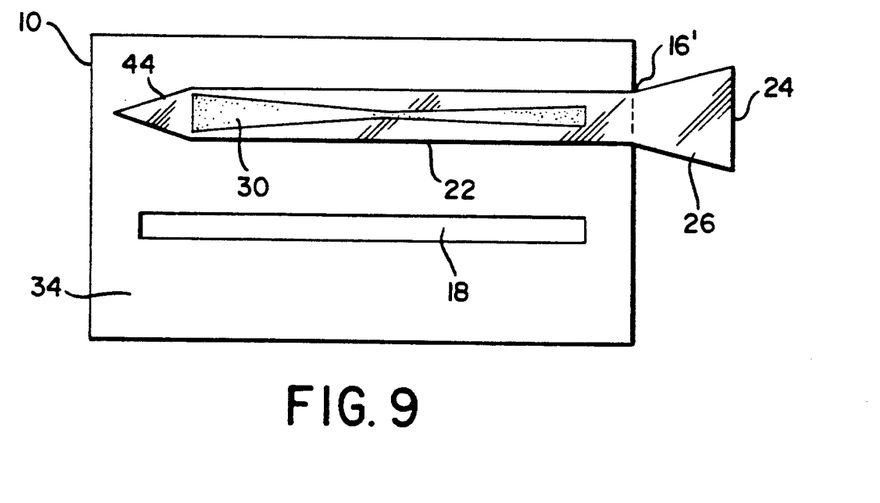

The remaining embodiments of FIGS. 7-9, illustrate custom tailoring of the spatial profile of the output light from an integrating cylinder 10. Previous designs generally attempted to achieve uniformity, which is often not the ideal profile, and they generally did not even achieve uniformity. In accordance with the present invention, a wide choice of profiles, including the often desirable case of having more light at the ends than at the center. This tailoring also permits the reduction or elimination of undesirable peaks in the angular profile of the output light.

There are various design considerations involved in the various disclosed embodiments. The taper of the glass rod 22 outside the cavity 10 at the port 26 concentrates a broad, collimated beam of light into a narrower, less collimated beam within the glass rod 22 and permits the use of a more collimated source lamp 12. This reduces Fresnel losses when the light from the lamp 12 enters the entry hole 16' of the rod 22. An anti-reflection coating may also be used on the exposed end 24 of the rod 22 to further reduce Fresnel losses.

In addition, the tapered port 26 concentrates the light from the larger diameter of the end face 24 to the smaller diameter of the remainder of the rod 22, and permits a smaller overall size of the cylinder 10 and a smaller entry hole 16' in the end face of the cylinder 10, reducing light losses back out the entry port. A further advantage of the tapered port 26 is that it makes the light inside the rod more divergent, which causes it to couple more strongly to the white stripe, thereby permitting higher efficiency for short devices. Shapes other than a conical taper may also be used, such as a Compound Parabolic Concentrator and other non-imaging optics concentrators, as taught in *High Collection Non-imaging Optics* by W. T. Welford and R. Winston, Academic Press (1989).

The taper of the glass rod of the port 26 should be weak, since if it is too strongly tapered some light will needlessly escape. While the taper can concentrate the light, the amount of concentration possible is inversely proportional to the angular divergence of the light falling on the end face 24 of the tapered port 26. This determines the maximum useful ratio of the small end diameter of rod 22 to the large diameter end face 24.

More light is scattered into the cavity by a wider white strip. Thus, by making the ends of the stripe wider than the center (as shown in FIG. 3), it is possible to produce more illumination at both ends of the rod than in the center. An alternative would be to have a white stripe of uniform width, but which has a duty cycle modulation of patches 42 (as shown in FIG. 7) to produce more illumination at both ends than in the center. The light propagating down the rod is depleted as it leaks from the rod 22. Thus, a longer white stripe patch 42' is needed at the far end than at the entry port end to scatter the same amount of light into the cavity 34.

The embodiments of FIGS. 3 and 7 have a mirror 36 at the far end face 46 of the glass rod 22. Making the white stripe 30 wide at the far end will increase the fraction of the light in the rod which is scattered out of the rod 22, but it will not scatter all of the light out. Without the mirror, most of the remaining light will pass out the flat end face 46 of the rod 22, perhaps producing excessive illumination at the end of the cavity 34. The mirror 36 will reflect this surplus light back into the rod 22, where it will again propagate down the rod by TIR and be scattered into the cavity in a controlled manner by the white stripe 30. This is often better than simply dumping this surplus light out the end face 46 (producing excess illumination) or discarding the light (by blackening the end of the rod or passing the end of the rod through the end of the cavity). Alternatives to the mirror are also possible, such as tapering the end 44 as shown in the embodiment of FIG. 9, which permits a controlled escape of nearly 100% of the surplus light.

The mirror 36 may be replaced by a white, diffusely reflecting surface spaced at least a few wavelengths of light away from the end of the rod. The white surface should not be farther away than a few tenths of the rod diameter. Because the white stripe preferentially scatters high angle light, the light reaching the mirror end of the rod is somewhat collimated (i.e. mostly low angle light), which does not couple well to the stripe. The white end surface diffusely scatters the light, once again permitting strong coupling to the stripe. If the rod 22 has index of refraction greater than 1.4, and the white surface is close to but not touching the end of the rod, nearly all of the light will be reflected back into the rod and confined by TIR. Also, high reflectivity (98%) spectrally broad white surfaces (e.g. Spectralon from Labsphere) are easier to obtain than high reflectivity, spectrally broad mirrors.

Keeping the diameter of the rod 22 small reduces its tendency to recapture some of the light reflecting within the cavity and transmit it back out the cavity entry hole 16'. The tapered entry port 26 of the rod 22 helps keep the diameter of the rod 22 small within the cavity 34.

Another embodiment replaces the mirrored end 36 of the rod by another lamp 12/lens 14/taper 26 identical (or not identical) to the lamp/lens/taper at the first end of the rod 22. Illuminators other than the lamp/lens combination may be used, e.g. a bulb or bulbs with an elliptical or parabolic reflector.

Various alternatives to white paint are possible. Roughening the glass surface by abrasives, scratches, chemical etching, frosting, gluing glass particles or the like in the region of the stripe 30 can also be used to scatter light out from the glass rod.

The entire length of the rod 22 can be tapered as shown in the embodiment of FIG. 8 to produce a controlled leakage of light from the rod 22, since as it becomes narrower it cannot indefinitely concentrate the light into a smaller and smaller diameter, and consequently some of the light violates the conditions for TIR and escapes.

Scattering centers (e.g., small particles or voids) could also be introduced into the bulk glass to scatter light out of the rod. A gradient in the index of refraction of the glass, with a lower index toward the far end of the rod, will also cause light to leak out along the length of the rod 22, because fewer light rays satisfy the conditions for TIR as the index of refraction decreases.

The present invention permits the design of more efficient integrating cavities, including integrating cavities which are of shapes other than cylindrical. Previous cavity designs needed large diameter cavities to achieve uniformity through scattering from one end of the cavity to the other. This invention provides better control of the light profile within the cavity, permitting the use of smaller diameter cavities. The smaller diameter means less surface area, hence less loss of light through absorption. Eliminating undesirable peaks in the angular profile by orienting the stripe or surface treatment 30 to preferentially scatter light away from the slit 18, as mentioned above, also improves efficiency, since less light is wasted at undesirable angles. Also, less light leaks out the cavity entry port, because of several closely related causes: (1) less light returns from the far end of the cavity back to the entry hole, (2) refraction of light by the glass rod reduces the apparent size of the entry hole (as viewed from the cavity), (3) light passing from the cavity into the rod will not propagate back toward the entry hole by TIR unless it scatters from the white stripe, and (4) the taper of the entry port 26 reduces the size of the hole 16'.

The cavity/rod arrangement is less sensitive to lamp source characteristics, such as alignment and divergence, than the case of the cavity with no glass rod but illuminated through an end entry hole. This simplifies alignment, and improves immunity to movement and vibration of the lamp source and lens system.

The preferred embodiments of the present invention have the entry port 50 in an end of the cylinder 10, although other configurations are possible. The light pipe embodiments may be constructed of material other than glass (e.g., plastic), but it must be of sufficiently high index of refraction (typically $n \geqq 1.414$) to provide total internal reflection (TIR) for most of the light entering the end face of the rod. The material must also be highly transparent, so that there is little absorption along the length of the rod.

The invention has been described in detail with particular reference to the preferred embodiment thereof, but it will be understood that variations and modifications can be effected within the spirit and scope of the invention.

What is claimed is:

1. A linear light integrating cavity comprising:
   an elongated light integrating cylinder having a longitudinal axis and enclosed by first and second end walls and a longitudinal side wall having a diffusely-reflecting interior surface, said longitudinal side wall having a longitudinally extending slit therein;
   elongated light pipe means having a longitudinal axis and a port at one end thereof extending outside the first end wall of the cylinder and a light reflecting characteristic varying along its length for emitting light entering the port or collecting light in the slit in a preferred intensity pattern long its length; and
   means for mounting the elongated light pipe means so that the longitudinal light pipe axis extends along the length of said integrating cylinder and in relation to the side wall thereof to direct light emitted therefrom toward the diffusely-reflecting interior surfaces, or collected thereby from the diffusely-reflecting interior surfaces.

2. The linear light integrating cavity of claim 1 wherein said integrating cylinder has a circular cross-section and a diffusely-reflecting interior surface constituting the side wall of the cavity and wherein said slit extends longitudinally in the side wall and parallel to the axis of the cylinder.

3. The linear light integrating cavity of claim 2 wherein said elongated light pipe means further comprises:
   a cylindrical light conductive rod having a first index of refraction, a first end having the light entry or exit port, and a diffusively reflective surface treatment extending generally longitudinally along a predetermined portion of the cylindrical rod.

4. The linear light integrating cavity of claim 3 wherein said mounting means further comprises:
   means for orienting said elongated light conductive rod with respect to the side wall of the integrating cylinder so that light is emitted or collected along the length of the rod after it is reflected from the diffusely reflective surface treatment.

5. The linear light integrating cavity of claim 3 wherein the diffusely reflective surface treatment comprises a coating of reflective material applied to the rod such that it reflects light normally confined within the rod by total internal reflection in the rod toward the reflective surfaces of the integrating cylinder or collects light striking the rod generally away from the coating and coming from the reflective surfaces of the integrating cylinder.

6. The linear light integrating cavity of claim 3 further comprising:
   means for mounting the rod within the integrating cavity at a location proximate the inner reflective surface and so that the reflective surface treatment on the rod is adjacent to the reflective surface and proximate to the slit, said rod having a longitudinal axis generally parallel to the elongated slit and longitudinal axis of the cylinder.

7. The linear light integrating cavity of claim 3 further comprising:
   means for mounting said rod in the wall of the integrating cavity at a location proximate the inner reflective surface and so that the reflective surface treatment on the rod is adjacent to the reflective surface and proximate to the slit, said rod having a longitudinal axis generally parallel to the elongated slit and longitudinal axis of the cylinder.

8. The linear light integrating cavity of claim 3 wherein the diffusely reflective surface treatment of the rod extends longitudinally along and generally parallel with an axis of the rod from the first end to a second end thereof in a pattern which varies to control the amount of light reflected or absorbed laterally thereby.

9. The linear light integrating cavity of claim 8 wherein the surface treatment pattern varies in width along the length of the rod.

10. The linear light integrating cavity of claim 8 wherein the surface treatment pattern comprises discontinuous patches of applied light reflective material extending generally longitudinally, the location and area of the patches varying in order to control light emission along the length of the rod.

11. The linear light integrating cavity of claim 1 wherein the said light pipe means further comprises:
    a cylindrical rod of light conductive material having a first index of refraction, having the port at a first end thereof and a second end positioned proximate the second end of the light integrating cylinder by said mounting means; and further comprising:
    a reflective surface positioned by said mounting means to face the second end of the rod to reflect light from the second end back toward the first end of the rod.

12. The linear light integrating cavity of claim 11 where the end facing reflective surface is a specularly reflective mirror attached to the second end of the rod.

13. The linear light integrating cavity of claim 11 wherein the end facing reflective surface is a diffusely reflective surface spaced apart but proximate to the second end of the rod.

14. The linear light integrating cavity of claim 1 wherein the light pipe means further comprises a second end positioned proximate the second end wall of the integrating cylinder that is tapered from a first diameter of the light pipe means proximate the second end thereof to a point at the second end thereof.

15. The linear light integrating cavity of claim 1 wherein said light pipe means further comprises:
    a generally circular cross-section, tapered rod of light conductive material having a first index of refraction, having the port at a first end thereof and a second end positioned proximate the second end wall of the light integrating cylinder and wherein the taper of the rod extends generally from a point proximate the port to the second end thereof, the diameter of the rod at the port being greater than the diameter of the rod at said second end.

16. The integrating cavity of claim 1 configured as a light source comprising:
   a source for producing a beam of light;
   an input port at one end of the elongated light pipe means that is tapered from a first diameter at the port to a second diameter at a point along the length thereof and wherein the diameter is reduced from the first diameter to the second diameter in order to concentrate the intensity of light from the light beam source emitted by the light pipe means along its length;
   means for mounting the elongated light pipe means with the tapered input point extending through the first end wall of the cylinder; and
   means for directing the light from the light beam source into the input port of the light pipe means.

17. The linear light integrating cavity of claim 16 wherein the tapered input port is circular in cross-section.

18. The linear light integrating cavity of claim 16 wherein said integrating cylinder has a circular cross-section and a diffusely-reflecting interior surface constituting the side wall of the cavity and wherein said slit extends longitudinally in the side wall and parallel to the axis of the cylinder.

19. The linear light integrating cavity of claim 16 wherein said elongated light pipe means further comprises:
   a cylindrical light conductive rod having the input port at a first end thereof and a diffusively reflective surface treatment extending generally longitudinally along a predetermined portion of the cylindrical rod.

20. The linear light integrating cavity of claim 19 wherein the diffusely reflective surface treatment of the rod extends longitudinally along and generally parallel with the axis of the rod from the first end to a second end thereof in a pattern which varies to control the amount of light reflected or absorbed laterally thereby.

21. The linear light integrating cavity of claim 20 wherein the surface treatment pattern varies in width along the length of the rod.

22. The linear light integrating cavity of claim 20 wherein the surface treatment pattern comprises discontinuous patches of applied light reflective material extending generally longitudinally, the location and area of the patches varying in order to control light emission along the length of the rod.

23. The linear light integrating cavity of claim 19 wherein said mounting means further comprises:
   means for orienting said elongated light conductive rod with respect to the side walls of the integrating cylinder so that light is emitted along its length and is reflected from the diffusely reflective surface of the cylinder until it escapes the exit slit.

24. The linear light integrating cavity of claim 23 further comprising:
   means for mounting the rod within the integrating cavity generally parallel to the elongated slit and axis of the cylinder at a location proximate the inner reflective surface and so that the reflective surface treatment on the rod is adjacent to the reflective surface and proximate to the slit.

25. The linear light integrating cavity of claim 19 wherein the diffusively reflective surface treatment comprises a coating of reflective material applied to the rod such that it reflects light normally confined within the core by total internal reflection in the rod or collects light striking the rod generally away from the coating and toward or from the reflective surfaces of the integrating cylinder.

26. The linear light integrating cavity of claim 16 wherein the said light pipe means further comprises:
   a cylindrical rod of light conductive material having a first index of refraction, having the input port at a first end thereof and a second end positioned proximate the second end wall of the light integrating cylinder by said mounting means; and further comprising:
   a reflective surface positioned by said mounting means to face the second end of the rod to reflect light from the second end back toward the first end of the rod.

27. The linear light integrating cavity of claim 26 where the reflective surface is a specularly reflective mirror attached to the second end of the rod.

28. The linear light integrating cavity of claim 26 wherein the reflective surface is a diffusely reflective surface spaced apart but proximate to the second end of the rod.

29. The linear light integrating cavity of claim 16 wherein the light pipe means further comprises a second end positioned proximate the second end wall of the integrating cylinder that is tapered from a first diameter of the light pipe means proximate the second end thereof to a point at the second end thereof.

30. The linear light integrating cavity of claim 16 wherein the light pipe means further comprises:
   a generally circular cross-section, tapered rod of light conductive material having a first index of refraction, having the input port at a first end of the light pipe and a second end positioned proximate the second end wall of the light integrating cylinder and wherein the taper of the rod extends generally from the second diameter to the second end thereof.

31. The linear light integrating cavity of claim 1 wherein said elongated light pipe means further comprises:
   a cylindrical light conductive rod having a first index of refraction, a first end having the light entry or exit port, and a diffusively reflective surface treatment extending generally longitudinally along a predetermined portion of the cylindrical rod.

32. The linear light integrating cavity of claim 31 wherein the diffusively reflective surface treatment comprises a coating of reflective material or particles applied to the rod or an etched or scratched treatment such that it reflects light normally confined within the rod by total internal reflection in the rod toward the reflective surfaces of the integrating cylinder or collects light striking the rod generally away from the coating and coming from the reflective surfaces of the integrating cylinder.

33. The linear light integrating cavity of claim 32 wherein the diffusely reflective surface treatment of the rod extends longitudinally along and generally parallel with the axis of the rod from the first end to a second end thereof in a pattern which varies to control the amount of light reflected or absorbed laterally thereby.

34. The linear light integrating cavity of claim 32 wherein the surface treatment pattern varies in width along the length of the rod.

35. The linear light integrating cavity of claim 32 wherein the surface treatment pattern comprises discontinuous patches of applied light reflective material extending generally longitudinally, the location and area of the patches varying in order to control light emission along the length of the rod.

36. The linear light integrating cavity of claim 1 wherein said elongated light pipe means further comprises:

a cylindrical light conductive rod having a first index of refraction, a first end having the light entry or exit port, and a diffusively reflective pattern of scattering impurities or voids distributed generally longitudinally within a predetermined portion of the cylindrical rod.

* * * * *